United States Patent
Lo et al.

(10) Patent No.: US 9,965,292 B2
(45) Date of Patent: May 8, 2018

(54) METHOD OF BLUETOOTH PAIRING WITH UEFI FIRMWARE AND COMPUTER SYSTEM THEREOF

(71) Applicant: American Megatrends Inc., Norcross, GA (US)

(72) Inventors: Chin-Sung Lo, Taipei (TW); Jui-Hsiu Chang, Taipei (TW); Pao-Min Chen, Taipei (TW); Sheng-Yao Hou, Taipei (TW); Han-Chuan Lee, Taipei (TW)

(73) Assignee: AMERICAN MEGATRENDS INC., Norcross, GA (US)

( * ) Notice: Subject to any disclaimer, the term of this patent is extended or adjusted under 35 U.S.C. 154(b) by 17 days.

(21) Appl. No.: 15/054,171

(22) Filed: Feb. 26, 2016

(65) Prior Publication Data
US 2017/0249160 A1    Aug. 31, 2017

(51) Int. Cl.
*G06F 9/44* (2018.01)
(52) U.S. Cl.
CPC ............. *G06F 9/4411* (2013.01); *H04W 4/80* (2018.02); *H04W 76/10* (2018.02)
(58) Field of Classification Search
CPC ........ G06F 9/4411; H04W 4/80; H04W 76/10
See application file for complete search history.

(56) References Cited

U.S. PATENT DOCUMENTS

| | | | | |
|---|---|---|---|---|
| 2010/0299510 | A1* | 11/2010 | Ueltschey | G06F 21/575 713/2 |
| 2011/0117842 | A1* | 5/2011 | Hong | H04M 1/7253 455/41.2 |
| 2012/0135683 | A1* | 5/2012 | Lee | H04L 63/101 455/41.2 |
| 2016/0259650 | A1* | 9/2016 | Lewis | G06F 9/4411 |

* cited by examiner

*Primary Examiner* — Albert Wang
(74) *Attorney, Agent, or Firm* — McClure, Qualey & Rodack, LLP

(57) ABSTRACT

A computer system includes a memory storing an UEFI firmware and a processor. The UEFI firmware supports pre-boot initialization of automatic first-time pairing of Bluetooth devices to the computer system. The processor is operatively coupled to the memory and is used to execute the UEFI firmware, wherein the executing the UEFI firmware performs the steps of: initiating a pre-connection routine to discover a default device information list in the computer system; gathering target device information from the wireless device; filtering default device information list and target device information with a filter condition; determining a result device information if the target device information matches the default device information; and recording the result device information to memory.

18 Claims, 5 Drawing Sheets

METHOD OF BLUETOOTH PAIRING WITH UEFI FIRMWARE AND COMPUTER SYSTEM THEREOF

BACKGROUND

1. Technical Field

The present disclosure generally relates to a method of a UEFI firmware and computer system thereof; particularly, the present disclosure relates to a method and computer system for executing a UEFI firmware supporting pairing of Bluetooth devices to the computer system during pre-boot initialization.

2. Description of the Related Art

Traditionally, computing systems may boot to an operating system. The boot up of the operating system is typically handled by a low level instruction code that is used as an intermediary between the hardware components of the computing system and the operating software and other high level software executing on the computing system. This low level instruction code is often known as the Basic Input/Output System ("BIOS") firmware and provides a set of software routines that allow high level software to interact with the hardware components of the computing system. The firmware performs routines for conducting Power-On Self Test ("POST") each time the computing system is powered on in order to test and initiate all hardware components in the computing system before handing off control to the operating system. These hardware components may include the system main memory, disk drives, and keyboards.

However, as technology has progressed with many devices such as peripheral devices advancing towards being wireless or cordless, boot up firmwares based on the traditional BIOS standard, which was originally designed for personal computers of International Business Machine Corporation (IBM), have become a point of restriction or limitation as to what the boot up firmware may control with respect to hardware and subsequently what hardware the Operating System may control. As new hardware and software technologies were being developed, this source of restriction became a major obstacle in the hardware-software interaction. As a result, a new standard of BIOS firmware has been proposed and widely adopted by many major industry leaders. This new standard is called the Unified Extensible Firmware Interface (UEFI).

With the adoption of UEFI standards, BIOS companies were able to produce UEFI firmware for computing systems, while companies producing Operating Systems were able to take advantage of the services these UEFI firmware provided by producing UEFI compliant Operating Systems. However, traditionally, wireless devices such as Bluetooth devices cannot be paired to the computer system during the pre-boot initialization period before the boot up firmware hands off control to the Operating System since the wireless devices are not physically connected to the computer system. For the manufacturers of the computer system, wireless devices that are sold as a package with the computer system would need to be manually connected and paired with each computer system before the computer systems are shipped out to be sold to the users; otherwise, users would need the technical knowledge to install these wireless devices manually to the computer system. As well, in terms of users buying third party wireless devices to pair with the computer system, users would not be able to access control of the boot up firmware through the wireless device without running the system once through to the Operating System stage in order to manually pair the wireless device to the computer system. In either case, the user is burdened with the task of manually installing the wireless device to the computer system when the wireless device is first presented to the computer system. Therefore, there is a need to reduce the installation complexities and frustration of the user that come from having to spend time and effort to manually install wireless devices to UEFI compliant Computer Systems.

SUMMARY

It is an objective of the present disclosure to provide a computing system and a method thereof having an UEFI firmware that can support automatic first-time pairing of wireless devices to computer systems during the pre-boot initialization period.

According to one aspect of the invention, a computer system includes a memory storing an UEFI firmware and a processor. The UEFI firmware supports pre-boot initialization of automatic first-time pairing of wireless devices to the computer system. The processor is operatively coupled to the memory and is used to execute the UEFI firmware, wherein the executing the UEFI firmware performs the steps of: initiating a pre-connection routine to discover a default device information list in the computer system; gathering target device information from the wireless device; filtering default device information list and target device information with a filter condition; determining a result device information if the target device information matches the default device information; and recording the result device information to memory.

According to another aspect of the invention, a method of computer processor execution of UEFI firmware in a computer system for automatic first-time pairing of wireless devices to the computer system, the UEFI firmware located in a memory, the memory operatively coupled to the processor, the method comprising: executing, by the processor, the UEFI firmware; when executing the UEFI firmware: initiating a pre-connection routine to discover a default device information list in the computer system; gathering target device information from the wireless device; filtering default device information list and target device information with a filter condition; determining a result device information if the target device information matches the default device information; and recording the result device information to memory.

DETAILED DESCRIPTION OF THE PREFERRED EMBODIMENT

Embodiments of the present invention provide methods and systems for executing a bootup firmware capable of supporting pre-boot initialization of a bootloader program in a computer system, wherein the bootup firmware can perform automatic first-time pairing of wireless devices to the computer system. In the following detailed description, references are made to the accompanying drawings that form a part hereof, and in which are shown by way of illustration specific embodiments or examples. These embodiments are only illustrative of the scope of the present invention, and should not be construed as a restriction on the present invention. Referring now the drawings, in which like numerals represent like elements through the several figures, aspects of the present invention and the exemplary operating environment will be described.

The present disclosure provides a computing system and method thereof for execution of UEFI firmware supporting automatic first-time pairing of wireless devices to the computer system during pre-boot initialization. Preferably, the computer system includes (but not limited to) laptop computers, personal computers, computer servers, handheld computing devices such as mobile telephones and tablet computers, as well as wearable computing devices.

Figure 1:
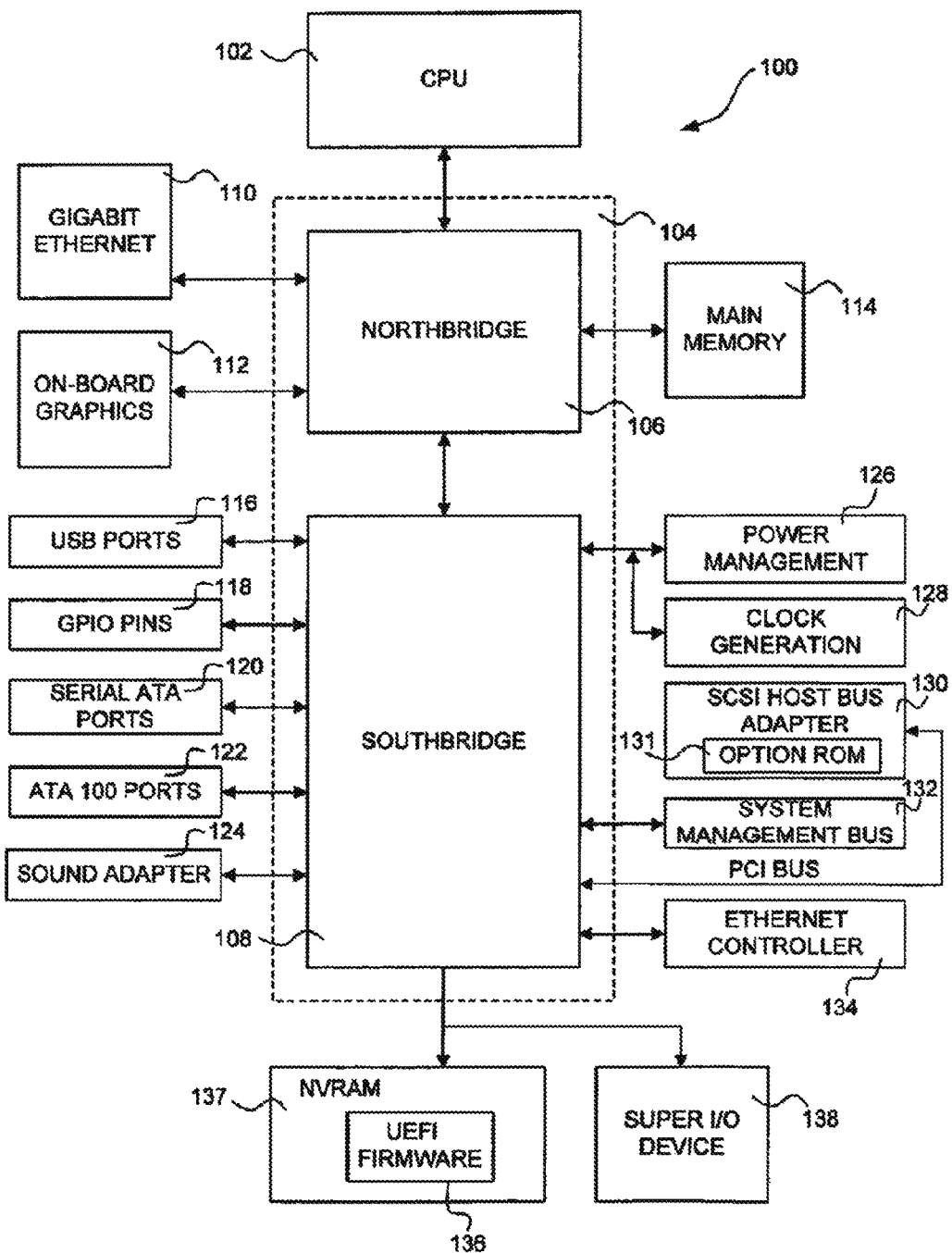
FIG. 1 is a view of an embodiment of the computer system.

FIG. 1 and the following discussion are intended to provide a brief, general description of a suitable computing environment in which the invention may be implemented. However, those skilled in the art will recognize that the invention may also be implemented in other suitable computing environments. Moreover, those skilled in the art will appreciate that the invention may also be practiced with other computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network.

Referring to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer system 100 that is operative to initiate an operating system boot from firmware. The blocks of FIG. 1 are intended to represent functional components of the computer architecture and are not intended to necessarily represent individual physical components. Functional components described may be combined, separated, or removed without departing from the overall sense and purpose of the computer architecture.

In order to provide the functionality described herein, the computer system 100 includes a baseboard, or "motherboard", which is a printed circuit board to which a multitude of components or devices may be connected by way of a system bus or other communication path. In one illustrative embodiment, a central processing unit (CPU) 102 operates in conjunction with a chipset 104. The CPU 102 may be a standard central processor that performs arithmetic and logical operations necessary for the operation of the computer. The CPU 102, in this and other embodiments, may include one or more of a microprocessor, a microcontroller, a field programmable gate array (FPGA), a complex programmable logic device (CPLD), an application specific integrated circuit (ASIC), and/or any other electronic computing device.

The chipset 104 includes a northbridge 106 and a southbridge 108. The northbridge 106 provides an interface between the CPU 102 and the remainder of the computer system 100. The northbridge 106 also provides an interface to one or more random access memories (RAM) used as a main memory 114 in the computer system 100 and, possibly, to an on-board graphics adapter 112. The northbridge 106 may also enable networking functionality through a gigabit Ethernet adapter 110. The gigabit Ethernet adapter 110 is capable of connecting the computer system 100 to one or more other computers via a network. Connections that may be made by the adapter 110 may include local area network (LAN) or wide area network (WAN) connections, for example. LAN and WAN networking environments are commonplace in offices, enterprise-wide computer networks, intranets, and on the Internet. The northbridge 106 is connected to the southbridge 108.

The southbridge 108 is responsible for controlling many of the input/output functions of the computer system 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot specification (BBS) compliant SCSI host bus adapter 130. In one embodiment, the bus comprises a peripheral component interconnect (PCI) bus. The southbridge 108 may also provide a system management bus 132 for use in managing the various components of computer system 100. Power management circuitry 126 and clock generation circuitry 128 may also be utilized during operation of the southbridge 108.

The southbridge 108 is also operative to provide one or more interfaces for connecting mass storage devices to the computer system 100. For instance, according to an embodiment, the southbridge 108 includes a serial advanced technology attachment (SATA) adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system, application programs, and other data. As known to those skilled in the art, an operating system comprises a set of programs that control operations of a computer and allocation of resources. An application program is software that runs on top of the operating system software, or other runtime environment, and uses computer resources to perform application specific tasks desired by a user of the computer system 100.

The mass storage devices connected to the southbridge 108 and the SCSI host bus adapter 130, and their associated computer-readable media, provide non-volatile storage for the computer system 100. Although the description of computer-readable media contained herein refers to a mass storage device, such as a hard disk or CD-ROM drive, it should be appreciated by those skilled in the art that computer-readable media can be any available media that can be accessed by the computer system 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface or another interface may be utilized to connect a computer storage medium such as a ROM or a non-volatile random access memory (NVRAM) 137 such as a flash memory. The computer storage medium may be used for storing the firmware 136 that includes modules containing instructions and data that help to startup the computer system 100 and to transfer information between elements within the computer system 100. However, in other different embodiments, the firmware 136 may be stored in any other areas in the computer system 100.

The firmware 136 may include program code that is compatible with the UEFI specification. It should be appreciated that in addition to the firmware 136 including an UEFI-compatible firmware, other types and combinations of firmware may be included. For instance, the firmware 136 may include additionally or alternatively a BIOS firmware and/or other type of firmware known to those in the art. Additional details regarding the operation of the UEFI firmware 136 are provided below with respect to the subsequent diagrams. It should be appreciated that the computer system 100 may not include all of the components shown in FIG. 1, may include other components that are not explicitly shown in FIG. 1, or may utilize an architecture completely different than that shown in FIG. 1.

Figure 2:
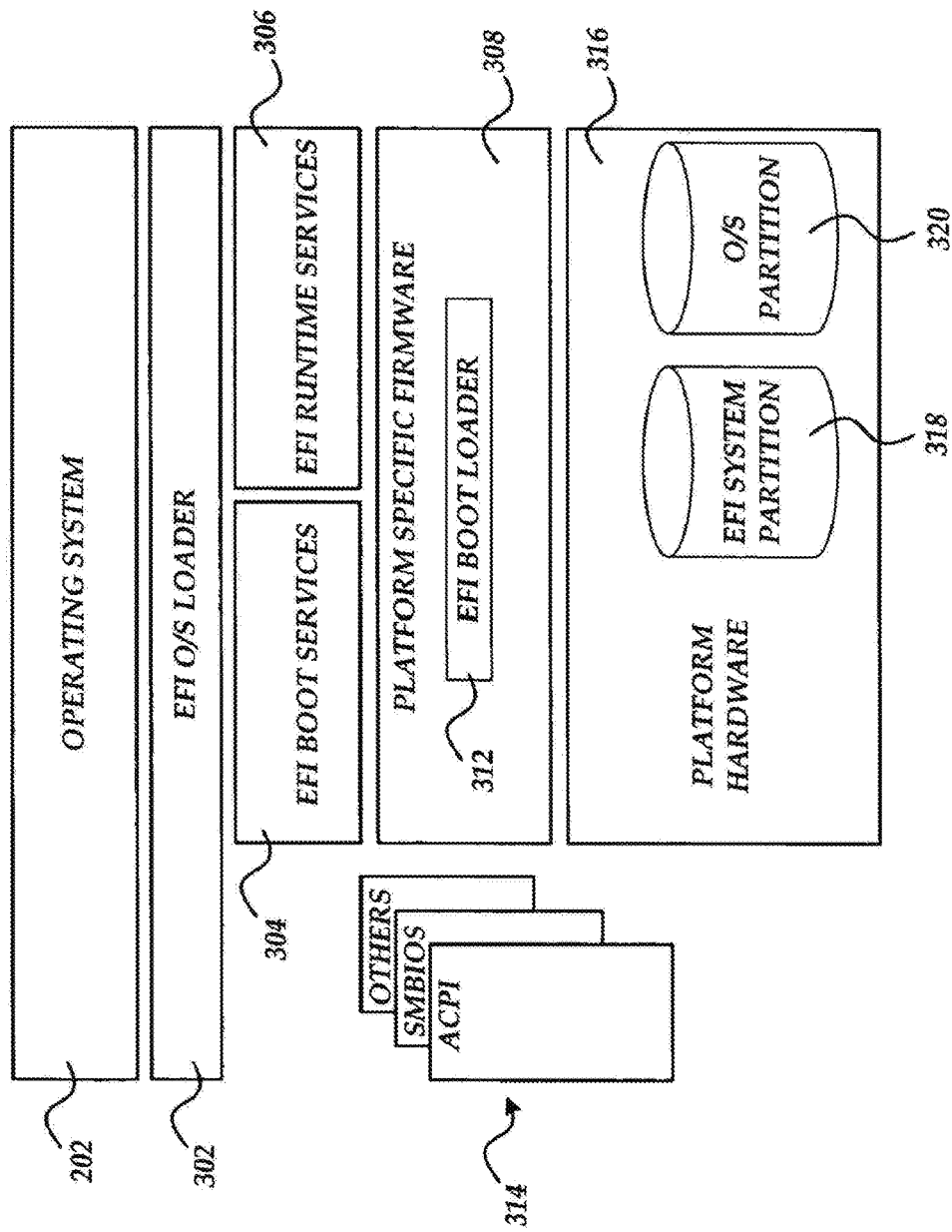
FIG. 2 is a view of an UEFI specification-compliant system.

Referring to FIG. 2, additional details regarding an UEFI specification-compliant system that may be utilized to provide an operating environment for the various implementations presented herein will be described. As shown in FIG. 2, the system includes a platform hardware 316 and an operating system (OS) 202. A platform firmware 308 may retrieve OS program code from the EFI system partition 318 using an OS loader 302, sometimes referred to as a boot loader or an OS boot loader. Likewise, the OS loader 302 may retrieve OS program code from other locations, including from attached peripherals or from the firmware 136 itself. The EFI system partition 318 may be an architecturally shareable system partition. As such, the EFI system partition 318 defines a partition and file system that are designed to allow safe sharing of mass storage between multiple vendors. An OS partition 320 may also be utilized.

Once started, the OS loader 302 continues to boot the complete operating system 202, potentially loading the operating system in stages, as with the GRUB, commonly associated with Linux operating systems. The OS loader 302 may use EFI boot services 304 and interface to other supported specifications to survey, comprehend, and initialize the various platform components and the operating system 202 software that manages them. Thus, interfaces 314 from other specifications may also be present on the system. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 are available to the OS loader 302 during the boot phase and to an operating system 202 when it is running. For example, runtime services may be presented to ensure appropriate abstraction of base platform hardware resources that may be needed by the operating system 202 during its normal operation. EFI allows extension of platform firmware by loading EFI drivers and EFI application images which, when loaded, have access to all EFI-defined runtime and boot services. Once the EFI firmware is initialized, it passes control to the boot loader 312.

Figure 3:
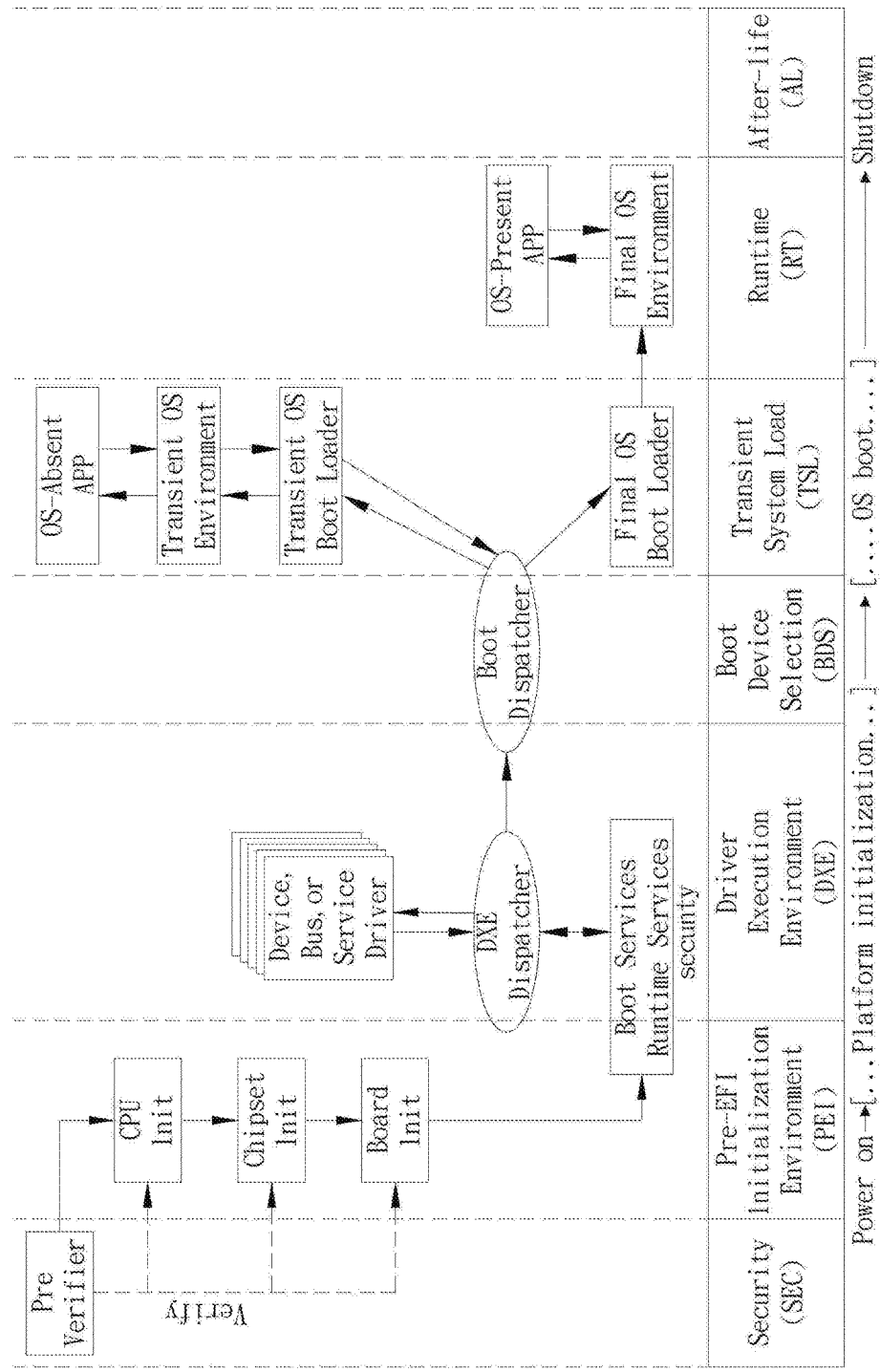
FIG. 3 is a view of the different phases during execution of an UEFI firmware.

Referring to FIG. 3, details are shown to illustrate the different phases in the boot up of an Operating System by a UEFI firmware. As shown in FIG. 3, when the computer system 100 is powered on, the UEFI firmware of the present invention is executed by the processor of the computer system 100. The UEFI firmware will first enter a Security (SEC) phase, wherein no memory has yet been initialized in the computer system 100. In the present phase, since no memory has yet been initialized, the processor's cache is used as a Random Access Memory (RAM) to pre-verify the central processing unit (CPU), the chipset, and the main board. Next, the UEFI firmware enters the Pre-EFI Initialization (PEI) phase, wherein the CPU, the chipset, the main board, and the memory of the computer system 100 are initialized. In the Driver Execution (DXE) phase, boot services, runtime services, and driver execution dispatcher services may be executed to initialize any other hardware in the computer system 100. Following the DXE phase, the UEFI firmware enters into the Boot Device Selection (BDS) phase. In the BDS phase, attempts are made to initialize console devices as well as various drivers corresponding to the boot loader for the Operating System. In the Transient System Load (TSL) phase, control is handed off to the Operating System to continue the start up of the computer system 100 before reaching the Runtime (RT) phase of normal operation of the computer system 100.

Figure 4:
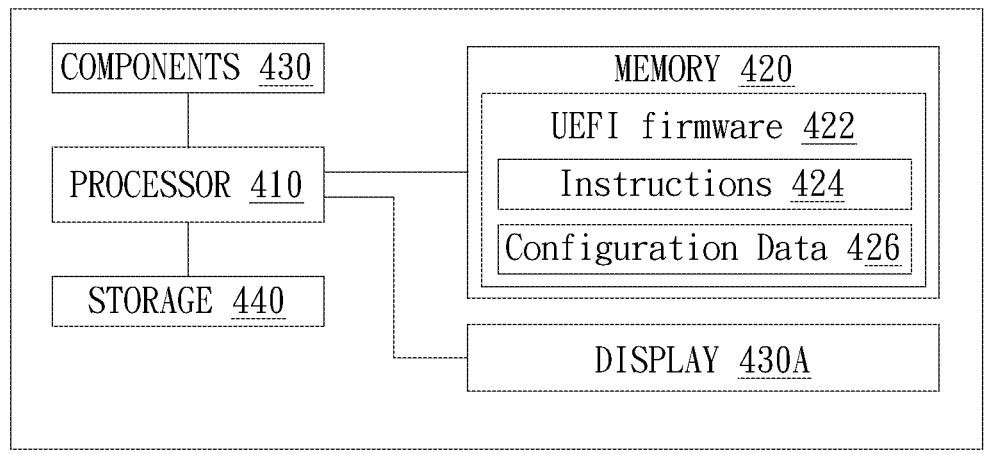
FIG. 4 is a view of another embodiment of the computer system.
Figure 4:
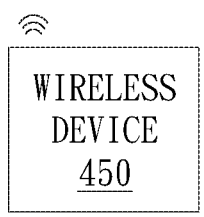

FIG. 4 illustrates an aspect of the embodiment of the present invention. As shown in FIG. 4, the computer system 100 may include processor 410, memory 420, components 430, storage 440, and display 430A, wherein the processor 410 is respectively coupled to the memory 420, the components 430, the storage 440, and the display 430A. One skilled in the art should be able to appreciate that the depiction of the computer system 100 in FIG. 4 may be viewed in conjunction with or separate from the computer system illustrated in FIG. 1. In the present embodiment, the memory 420 may be a flash memory or CMOS to store the UEFI firmware 422, wherein the UEFI firmware 422 has instruction sets 424 and configuration data 426. The storage 440 may be a hard drive disk, external drive, flash drive, network drive, or any other memory storage, wherein the storage 440 stores the EFI partition consisting of the boot up loader for the Operating System of the Computer system 100. The components 430 and the display 430A may be considered as hardware devices that are initialized by the UEFI firmware during execution of the UEFI firmware in the boot up period.

As illustrated in FIG. 4, wireless device 450 is not connected to the computer system 100 at the outset, but may be connected wirelessly during the pre-initialization boot up period in the execution of the UEFI firmware, as disclosed by the present invention. In the present embodiment, wireless device 450 is preferably a Bluetooth device, such as a Bluetooth capable peripheral device and the like.

Traditionally, if wireless device 450 has never been installed or paired with computer system 100 before, the computer system 100 would need to be booted to the Operating System first before the wireless device 450 can be paired to the computer system 100 under the Operating System environment. In other words, the wireless component conventionally would not be able to be paired to the computer system 100 during the platform initialization period (pre-EFI initialization environment and driver execution environment) without manually and physically connecting the wireless device 450 to the computer system 100.

Figure 5:
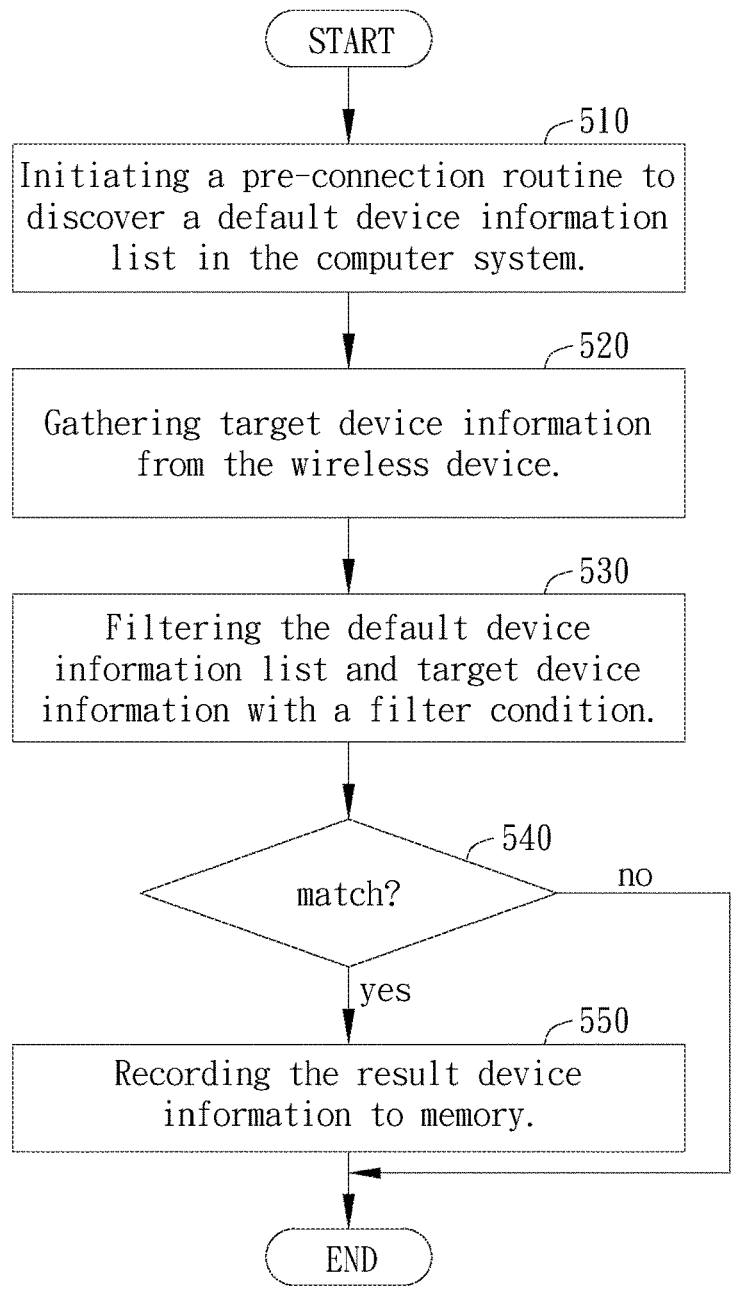
FIG. 5 is a flowchart of the execution of the UEFI firmware.

In a preferred embodiment of the present invention, as illustrated in FIG. 5, a method of computer processor execution of UEFI firmware for automatic first-time pairing of wireless device to the computer system 100 is provided. As shown in the flowchart in FIG. 5, the method includes steps 510 to 540, wherein these steps are discussed in greater detail in the following:

Step 510 includes the UEFI firmware initiating a pre-connection to the wireless device 450. In the present embodiment, the wireless device 450 may be a Bluetooth device, such as an input/output device like a keyboard or mouse. Prior to the computer system 100 being powered on, the wireless device 450 is physically not connected to the computer system 100. In the present embodiment, under the assumption that the wireless device 450 has never been paired with the computer system 100 before, when the computer system 100 is powered on, the UEFI firmware of the present invention that is installed on the computer system 100 will first initiate a pre-connection routine. The purpose of the pre-connection routine is to conduct preliminary internal research within the computer system 100 to see if there is any device information that may possibly correspond to wireless devices 450. For this purpose, the pre-connection routine will search within the computer system 100 to see if there is any device information available on any wireless device 450.

In the present embodiment, a default device information list pertaining to device information corresponding to various different wireless devices 450 may be stored as one or more variables in the UEFI firmware. More specifically, theses variables may be stored as a configuration file in the UEFI firmware. When the UEFI firmware is first executed by the computer system 100 upon power on, during the pre-connection routine, these variables pertaining to device information may be retrieved by the pre-connection routine. It should be noted that at this instance, no wireless device 450 has been connected or paired with computer system 100. By pre-storing the device information of the wireless device 450 into the UEFI firmware, the UEFI firmware would have access to these device information during the pre-boot up initialization period. For instance, if the computer system 100 was sold as a package with the wireless device 450 (such as an I/O Bluetooth mouse device), manufacturers may find it ideal to pre-store the device information corresponding to the wireless device 450 in the UEFI firmware so that the pre-connection routine may easily find a list of complete device information, wherein one set of device information in the list may correspond to the wireless device 450. However, in other different embodiments, the device information corresponding to the wireless device 450 may be found pre-stored in other areas of the computer system 100. The pre-connection routine may perform a search within the computer system 100 and generate a list of relevant data it may find that could possibly correspond to the wireless device 450. For instance, device information corresponding to the wireless device 450 may be found stored in a storage device of the computer system 100, such as a hard drive.

As illustrated in FIG. 5, Step 520 includes gathering target device information from the wireless device 450. In the present embodiment, after Step 510 of initiating the pre-connection routine has been performed, there could possibly be a long list of device information corresponding to many different wireless devices. In order to determine which of the sets of device information on the default device list can be applied to pairing the wireless device 450 to the computer system 100, more information would be needed on the specific wireless device 450 that is to be paired. Therefore, the UEFI firmware of the present invention performs the target device information gathering routine of Step 520 to gather as much information as possible from the specific wireless device 450 that is to be paired. Specifically, this is accomplished through one of two ways: gathering target device information from the wireless device 450 through the Host Controller Interface (HCI) principles, or through the standpoint of gathering target device information from the wireless device 450 by way of the service discovery protocol (SPD). However, it should be noted that these two approaches to gathering target device information from the wireless device 450 are not mutually exclusive; a combination of the two approaches may be employed to increase the accuracy and success rate of the pairing procedure.

In terms of the HCI approach, in most instances where it can be expected with relative certainty that the wireless device 450 should be of a specific device type, such as the wireless device 450 being an I/O device type (ex. keyboard or a mouse), the HCI approach may be used. In the present embodiment, the HCI provides a uniform command interface to a controller. In this case, the HCI provides a command interface to the wireless device 450 such that test commands may be sent to the wireless device 450 and responses to the test commands may be received. By utilizing the HCI approach, target device information pertaining to the device type (such as whether the wireless device 450 is a keyboard, mouse, etc) and/or signal strength (in the vicinity of the computer system 100) may be gathered from the wireless device 450. These target device information can then be used as a filtering condition to compare to any public or default device information on comparable known devices.

For example, if the device type and signal strength gathered from the wireless device 450 through the HCI approach is compared to known device information of standard Bluetooth keyboards or mouse, it may be discovered with high probability that the wireless device 450 should be a Bluetooth keyboard or mouse device. In this manner, the list of device information generated in the pre-connection routine in Step 510 may be compared to the gathered device information found in the HCI approach, wherein data in the list of device information not pertaining to the gathered target device information found in the HCI can be filtered out. This allows the size of the list of device information to become a more manageable size to conduct device pairing. In other words, the list of device information gleaned in Step 510 may be condensed according to the result found in the HCI approach. As an example, when the UEFI firmware performs Step 520 under the HCI approach, the HCI approach may discover that the wireless device 450 is of an I/O device type. In view of this, any data not pertaining to I/O devices on the list of device information (generated in Step 510) can be ignored. In other words, the list of device information is narrowed down such that sets of device information not corresponding to I/O devices can be ignored, thereby allowing the decision (of which device information should be utilized to pair the wireless device 450 to the computer system 100) to be made easier.

In another embodiment, Step 520 may also perform the gathering of device information from the wireless device 450 via the SDP approach. In the present embodiment, the UEFI firmware can retrieve attributes from the wireless device 450 via SDP. Generally, the service discovery protocol provides a means for applications to discover which services are available and to determine the characteristics of those available services. In terms of the UEFI firmware of the present invention, in one embodiment where the wireless device 450 is a Bluetooth device, the UEFI firmware provides support for Service Discovery in Bluetooth environment. In other words, during the execution of the UEFI firmware and after the UEFI firmware has discovered all hardware present in the computer system 100, the UEFI firmware may have discovered a Bluetooth compliant wireless communication module in the computer system 100. The UEFI firmware can utilize this communication module via Service Discovery Protocols in the Bluetooth environment to communicate with the Bluetooth wireless device 450 and subsequently receive various attributes from the wireless device 450. Examples of Bluetooth related attributes that may be received from the wireless device 450 via SPD may include (but not limited to) the Universal Attribute, Service Discovery Server Service Class Attribute, Browse Group Descriptor Service Class Attribute, and/or Bluetooth HID (Human Interface Device) device SDP. Depending on the manufacturer of the wireless device 450, these attributes may contain various information on the wireless device 450, such as vendor ID and/or group ID.

As illustrated in FIG. 5, Step 530 includes filtering the default device information list and the target device information with a filter condition. This filter condition may be any one of assumptions about the wireless device 450. For example, as previously mentioned, if the assumption is that the wireless device 450 is going to be a Bluetooth keyboard or mouse, the filter condition may be set such that any and all sets of device information corresponding to keyboard and/or mouse would be filtered out of the target device information and the default device information list. In this manner, the default device information list may be shortened to only a few sets of device information. In other embodiments, the filter condition may be retrieved by the UEFI firmware via the serial presence detect. Generally, the serial presence detect is a memory hardware feature that allows the computer system 100 to find out what memory is currently present. An example of an implementation of serial presence detect could be an Electrically Erasable Programmable Read-only Memory (EEPROM) on a SDRAM memory module, wherein the EEPROM stores calibration tables or device configurations. In this manner, when the computer system 100 is first powered on, the computer system 100 can access via the serial presence detect the attributes (if they were saved there) corresponding to the wireless device 450. In other words, in the present embodiment, data or information corresponding to the nature of a wireless device 450 may be pre-stored in the serial presence detect memory by the manufacturer of the computer system 100, wherein the data stored there can relate to a vendor ID, BD_ADDR, Class of Device, Vendor Name, and/or UUID that may be cross referenced to the target information device and the default device information list. For example, if a vendor ID is specifically given as the filter condition, any set of device information in the default device information list corresponding to the vendor ID would be filtered out of consideration. In this manner, only sets of device information in the default device information list corresponding to the given vendor ID would be left as possible candidates to match to the target device information.

In Step 540, a result device information is determined if, after the filtering process, the target device information matches any set of device information in the default device information list. If no match is made, the method of the present invention can be repeated starting from Step 510 again to see if another different wireless device 450 can be automatically paired to the computer system 100.

Step 550 includes recording the result device information to memory, such as writing it to the UEFI firmware. In other words, since the target device information was successfully matched to a set of device information in the default device information list, the recording of the result device information represents the successful registering of the wireless device 450 being automatically paired to the computer system 100 during the pre-initialization boot up period.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method of computer processor execution of UEFI firmware in a computer system for automatic first time pairing of a wireless devices to the computer system, the UEFI firmware located in a memory, the memory operatively coupled to the processor, the method comprising:
   executing, by the processor, the UEFI firmware;
   when executing the UEFI firmware:
   initiating a pre-connection routine to discover a default device information list in the computer system;
   gathering target device information from the wireless device;
   filtering the default device information list and target device information with a filter condition;
   determining a result device information if the target device information matches a set of device information in the default device information list; and
   recording the result device information to memory;
   wherein the step of gathering target device information from the device further comprising:
   retrieving a device type from the wireless device; and
   determining a signal strength from the wireless device.

2. The method of claim 1, wherein the step of initiating the pre-connection routine to discover the default device information list in the computer system further comprising: retrieving the default device information list as a variable in a configuration file in the UEFI firmware.

3. The method of claim 1, wherein the step of initiating the pre-connection routine further comprising: searching, in the computer system, for a set of device information corresponding to the wireless device.

4. The method of claim 1, wherein the step of filtering the default device information list and target device information with a filter condition further comprising:
   filtering, from the default device information list, sets of device information matching the filter condition.

5. The method of claim 1, wherein the step of gathering the target device information from the wireless device further comprising:
   retrieving attributes from the wireless device via Service Discovery Protocol;
   retrieving device profile information from the wireless device via Host Computer Interface; and
   generating the target device information from the attributes and the device profile information.

6. The method of claim 5, wherein the step of filtering the default device information list and target device information with a filter condition further comprising:
   filtering, from the default device information list, sets of device information matching the filter condition.

7. The method of claim 6, wherein the step of wherein the step of filtering the default device information list and target device information with a filter condition further comprising:

retrieving the filter condition via serial presence detect.

8. The method of claim 1, wherein the step of recording the result device information to memory further comprising:

storing the result device information as a table or UEFI variable in memory.

9. A Computer System comprising:

a memory storing an UEFI firmware for supporting pre-boot initialization of automatic first time pairing of a wireless devices to the computer system; and a processor operatively coupled to the memory and executing the UEFI firmware;

wherein executing the UEFI firmware performs the steps of:

initiating a pre-connection routine to discover a default device information list in the computer system;

gathering target device information from the wireless device;

filtering default device information list and target device information with a filter condition;

determining a result device information if the target device information matches the default device information; and recording the result device information to memory;

wherein the step of gathering device information of the device further comprising:

retrieving a device type from the wireless device; and determining a signal strength from the wireless device.

10. The computer system of claim 9, wherein the processor includes a central processing unit, and the memory includes flash memory and read-only memory.

11. The computer system of claim 9, wherein the wireless device is a Bluetooth compliant device, a peripheral device, or an human interaction device.

12. The computer system of claim 9, wherein the step of initiating the pre-connection routine further comprising: retrieving a default device information list from one or more variables in a configuration file in the UEFI firmware.

13. The computer system of claim 9, wherein the step of initiating the pre-connection to the device further comprising: searching, in the computer system, for a set of device information corresponding to the wireless device.

14. The computer system of claim 9, wherein the step of filtering the default device information list and target device information with a filter condition further comprising:

filtering, from the default device information list, sets of device information matching the filter condition.

15. The computer system of claim 9, gathering the target device information from the wireless device further comprising:

retrieving attributes from the wireless device via Service Discovery Protocol;

retrieving device profile information from the wireless device via Host Computer Interface; and generating the target device information from the attributes and the device profile information.

16. The computer system of claim 15, wherein the step of filtering the default device information list and target device information with a filter condition further comprising:

filtering, from the default device information list, sets of device information matching the filter condition.

17. The computer system of claim 16, wherein the step of filtering the default device information list and target device information with a filter condition further comprising:

retrieving the filter condition via serial presence detect.

18. The computer system of claim 9, wherein the step of recording the result device information to memory further comprising:

storing the result device information as a table or UEFI variable in memory.

* * * * *